United States Patent
Miller

(10) Patent No.: US 9,956,817 B2
(45) Date of Patent: May 1, 2018

(54) WHEEL ASSEMBLY TIE BOLT RETENTION SYSTEM

(71) Applicant: GOODRICH CORPORATION, Charlotte, NC (US)

(72) Inventor: Jerry Miller, Kettering, OH (US)

(73) Assignee: GOODRICH CORPORATION, Charlotte, NC (US)

(*) Notice: Subject to any disclaimer, the term of this patent is extended or adjusted under 35 U.S.C. 154(b) by 159 days.

(21) Appl. No.: 14/615,000

(22) Filed: Feb. 5, 2015

(65) Prior Publication Data
US 2016/0229226 A1    Aug. 11, 2016

(51) Int. Cl.
| | | |
|---|---|---|
| *B60B 3/08* | (2006.01) | |
| *F16B 39/04* | (2006.01) | |
| *B64C 25/36* | (2006.01) | |
| *F16B 39/28* | (2006.01) | |
| *B60B 3/00* | (2006.01) | |

(52) U.S. Cl.
CPC .............. *B60B 3/087* (2013.01); *B60B 3/08* (2013.01); *B64C 25/36* (2013.01); *F16B 39/04* (2013.01); *F16B 39/28* (2013.01); *B60B 3/008* (2013.01); *B60B 2310/305* (2013.01); *B60B 2310/306* (2013.01); *B60B 2900/325* (2013.01); *B60Y 2200/50* (2013.01); *B60Y 2200/51* (2013.01)

(58) Field of Classification Search
CPC ......... B60B 23/10; B60B 23/06; B60B 3/087; B60B 3/08; B60B 3/00; F16B 39/04; F16B 39/28; F16B 39/06; B64C 25/36
USPC ............ 301/64.201, 64.202, 64.203, 64.301, 301/64.302, 64.303, 64.305, 64.706; 411/315, 316, 317, 318, 319, 320
See application file for complete search history.

(56) References Cited

U.S. PATENT DOCUMENTS

| | | | | |
|---|---|---|---|---|
| 566,050 | A * | 8/1896 | Woodard | F16B 39/04 269/90 |
| 772,811 | A * | 10/1904 | Lukehart | F16B 39/04 411/205 |
| 962,321 | A * | 6/1910 | Crouch | F16B 39/04 411/207 |
| 1,126,847 | A * | 2/1915 | Pardini | F16B 39/04 184/48.1 |
| 1,135,899 | A * | 4/1915 | Hill | B60R 25/00 411/319 |
| 1,234,081 | A * | 7/1917 | Petersen | F16B 39/04 411/205 |
| 1,289,867 | A | 12/1918 | Moore | |
| 2,758,628 | A * | 8/1956 | Rice | F16B 39/101 301/35.624 |

(Continued)

FOREIGN PATENT DOCUMENTS

GB    152307 A * 4/1921 .............. B60B 3/08

OTHER PUBLICATIONS

Extended European Search Report dated May 24, 2017 in European Application No. 16154433.3.

*Primary Examiner* — Jason R Bellinger
*Assistant Examiner* — Scott A Browne
(74) *Attorney, Agent, or Firm* — Snell & Wilmer L.L.P.

(57) ABSTRACT

The present disclosure includes a wheel assembly having a tie bolt retention system. Tie bolt retention systems of the present disclosure include retention holes and retention elements. Retention elements may engage retention holes to prevent loosening or disengagement of a tie nut from the tie bolt.

7 Claims, 3 Drawing Sheets

(56) References Cited

U.S. PATENT DOCUMENTS

| | | | | |
|---|---|---|---|---|
| 2,890,734 A * | 6/1959 | Mullin | ............... | F16B 39/20 |
| | | | | 411/87 |
| 2,998,282 A * | 8/1961 | Moyer | ............... | B21K 1/28 |
| | | | | 152/404 |
| 3,648,749 A * | 3/1972 | Warren | ............... | F16B 39/10 |
| | | | | 411/87 |
| 4,102,379 A * | 7/1978 | Kamiya | ............ | B60B 25/22 |
| | | | | 152/404 |
| 4,308,733 A * | 1/1982 | Tampa | ............ | B62D 43/00 |
| | | | | 224/42.24 |
| 5,116,178 A * | 5/1992 | Lerman | ............ | F16B 39/20 |
| | | | | 403/316 |
| 5,624,218 A * | 4/1997 | Dauwalter | ......... | F16B 39/101 |
| | | | | 411/373 |
| 5,849,174 A * | 12/1998 | Sanghera | ............ | C12Q 1/001 |
| | | | | 204/403.14 |
| 5,951,222 A * | 9/1999 | Gosling | ............ | B23P 19/067 |
| | | | | 29/452 |

* cited by examiner

WHEEL ASSEMBLY TIE BOLT RETENTION SYSTEM

FIELD OF INVENTION

The present disclosure related generally to aircraft wheel assemblies and, more specifically, to tie bolt retention systems for aircraft wheel assemblies.

BACKGROUND OF THE INVENTION

Conventional aircraft wheel assemblies may be of the split wheel type, in which two wheel sections are secured together to form the wheel. Frequently, the two wheel sections are secured to each other using a number of concentrically-positioned tie bolt assemblies having a bolt head at one end and a nut at the opposing end. During operation of the wheel, the nut may be come loose and potentially disengage with the bolt, reducing the engagement between the two wheel sections.

SUMMARY OF THE INVENTION

A wheel assembly in accordance with various embodiments may comprise a first wheel section having a first outer surface, a first mate face, and a first bolt hole, and a second wheel section having a second mate face, a second outer surface, and a second bolt hole, wherein the second mate face is configured to contact and engage with the first mate face, and wherein the second bolt hole is configured to align with the first bolt hole, a tie bolt having a threaded end and length sufficient to pass through the first bolt hole and the second bolt hole, wherein the tie bolt comprises a retention hole positioned at the threaded end, a nut configured to engage with the threaded end of the tie bolt, and a nut retention element engaged with the retention hole. The tie bolt may pass through the first bolt hole from the first outer surface and through to the second outer surface. A first washer may be positioned between a head of the tie bolt and the first outer surface, and a second washer may be positioned between the second outer surface and the nut. The first wheel section may comprise a plurality of first bolt holes, the second wheel section may comprise a plurality of second bolt holes, and the wheel assembly may comprise a plurality of tie bolts. A separate retention element may engage with the retention hole of each of the tie bolts. Each of the plurality of tie bolts may comprise a retention hole positioned at the threaded end. Each tie bolt may comprise at least two retention holes, which may be located along an axis of the tie bolt or clocked with relation to the axis of the tie bolt.

A tie bolt system in accordance with various embodiments may comprise a tie bolt having a threaded end and a length sufficient to pass through a first bolt hole and a second bolt hole, wherein the tie bolt comprises a retention hole positioned at the threaded end, a nut configured to engage with the threaded end of the tie bolt, and a nut retention element engaged with the retention hole. A first washer may be positioned between a head of the tie bolt and the first bolt hole, and a second washer may be positioned between the second bolt hole and the nut. The tie bolt comprises at least two retention holes, which may be located along an axis of the tie bolt or clocked with relation to the axis of the tie bolt.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

The present disclosure describes various embodiments of wheel assemblies including tie bolt systems. Such tie bolt systems may include nut retention elements to prevent tie nuts from loosening and/or removing from tie bolts, potentially allowing for partial or full disengagement between the various wheel sections.

Figure 1:
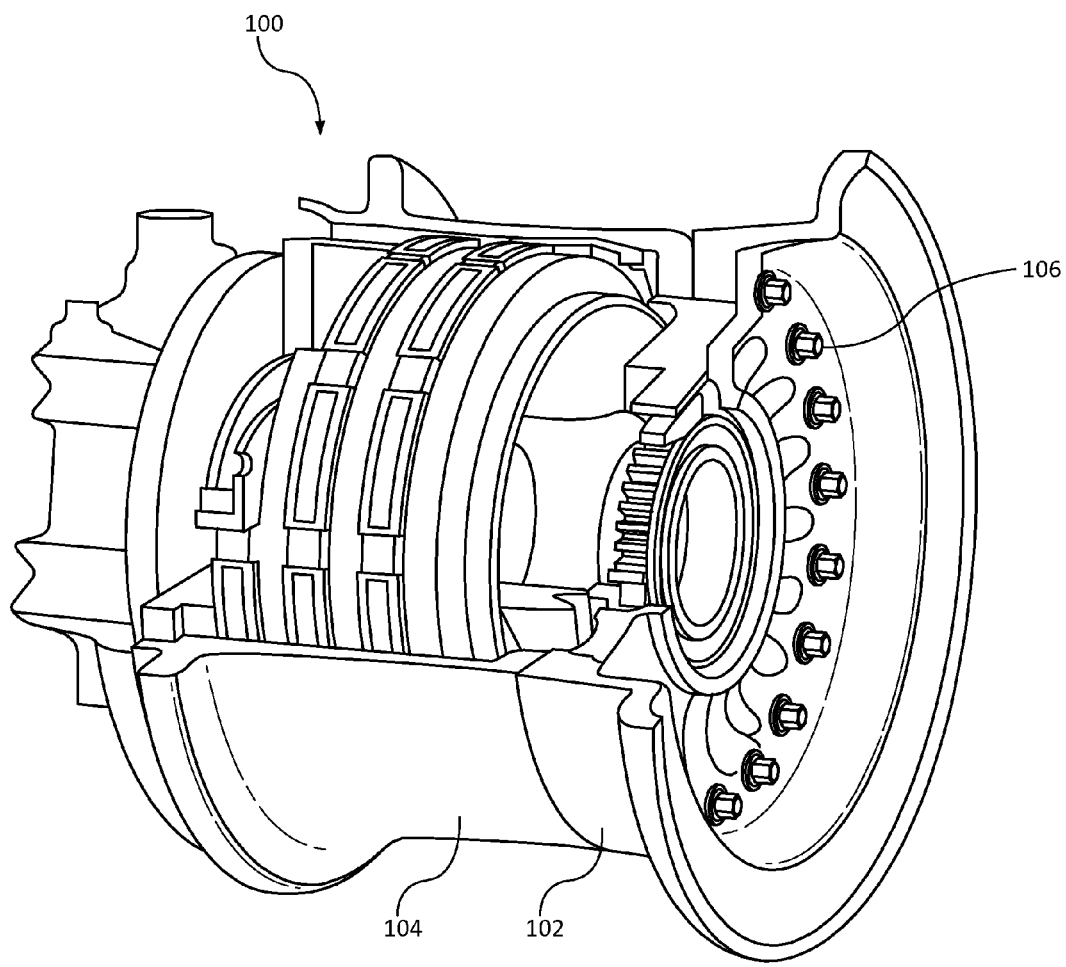
FIG. 1 illustrates a perspective view of an aircraft wheel assembly, in accordance with various embodiments.

With initial reference to FIG. 1, a wheel assembly 100 in accordance with various embodiments is illustrated. In various embodiments, wheel assembly 100 comprises a split wheel assembly. For example, wheel assembly 100 may comprise a first wheel section 104 coupled to a second wheel section 102. As will be discussed in greater detail, first wheel section 104 and second wheel section 102 may be coupled to each other by a tie bolt system 106.

Figure 2A:
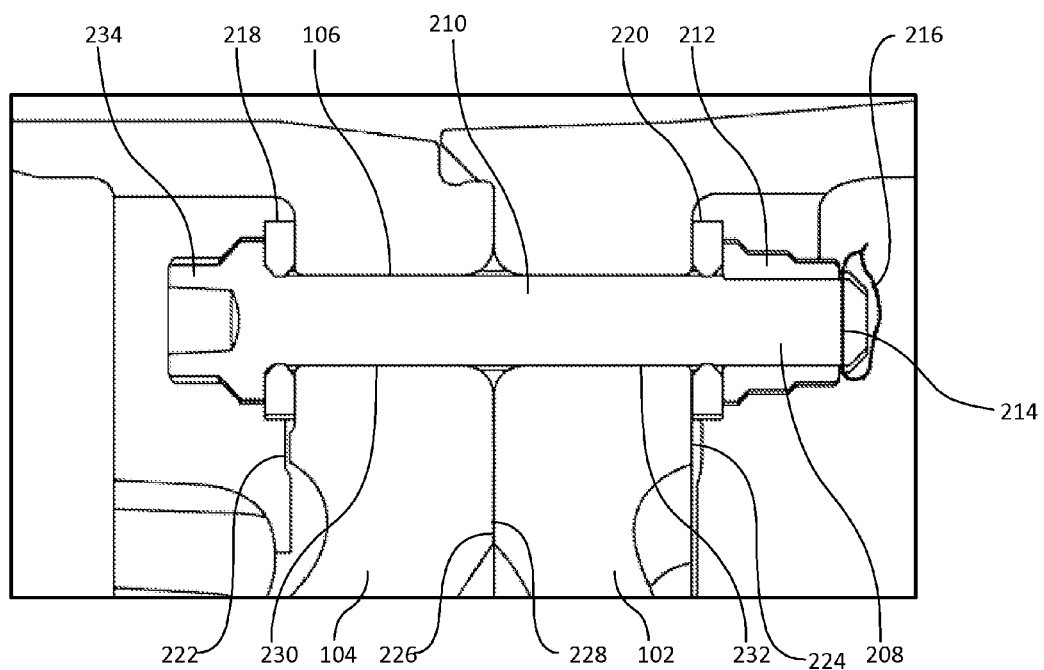
FIG. 2A illustrates a cross sectional view of a section of an aircraft wheel assembly, in accordance with various embodiments.

With reference to FIG. 2A, first wheel section 104 comprises a first mate face 226. First mate face 226 may be configured to contact and engage with a second mate face 228 of second wheel section 102.

In various embodiments, first wheel section 104 comprises a first bolt hole 230. First bolt hole 230 may pass through a first outer surface 222, through first wheel section 104, and out first mate face 226. Similarly, second wheel section 102 may comprise a second bolt hole 232 which passes through a second outer surface 224, through second wheel section 102, and out second mate face 228.

Tie bolt system 106 may be configured to pass through first bolt hole 230 and second bolt hole 232 to secure first wheel section 104 and second wheel section 102 together. In various embodiments, tie bolt system 106 comprises a tie bolt 210 having a length sufficient to pass through first bolt hole 230 and second bolt hole 232.

Tie bolt system 106 may comprise, for example, a bolt head 234. In various embodiments, bolt head 234 is positioned adjacent to first outer surface 222. Tie bolt 210 may further comprise a first washer 218 positioned between bolt head 234 and first outer surface 222.

Tie bolt system 106 may further comprise a tie nut 212. For example, tie bolt 210 may comprise a threaded end 208, and tie nut 212 may be configured to engage with threaded end 208. In various embodiments, tie bolt system 106 further comprises a second washer 220 positioned between second outer surface 224 and tie nut 212.

In various embodiments, tie bolt 210 comprises at least one retention hole 214. For example, retention hole 214 may be positioned at threaded end 208 of tie bolt 210. In such embodiments, retention hole 214 may be located at a point beyond tie nut 212 as viewed along the central axis of tie bolt 210. After tie nut 212 is tightened, a retention element 216 may pass through and engage with retention hole 214 to prevent tie nut 212 from loosening and/or disengaging with tie bolt 210.

Figure 2B:
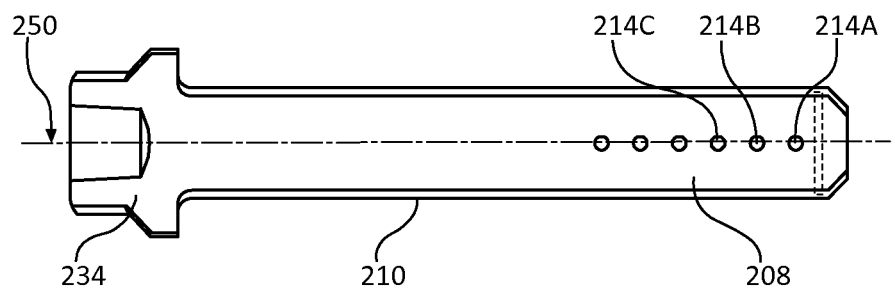
FIGS. 2B and 2C illustrate cross sectional views of various tie bolt assemblies, in accordance with various embodiments.
Figure 2C:
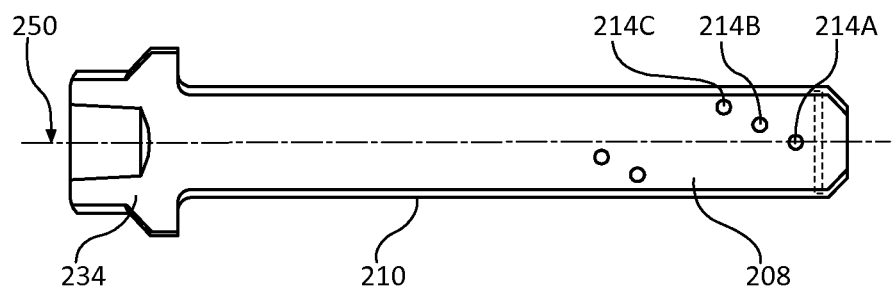

Tie bolt 210 may comprise a plurality of retention holes 214. For example, as illustrated in FIG. 2B, retention holes 214a, 214b, and 214c may be positioned along an axis 250. In further embodiments, as illustrated in FIG. 2C, retention holes 214a, 214b, and 214c may be clocked or rotated in relation to axis 250. Although described with reference to two specific embodiments, any number and/or orientation of retention holes 214 is with the scope of the present disclosure.

In various embodiments, retention element 216 is passed through retention hole 214 (or 214a, 214b, or 214c) after tie nut 212 is secured to threaded end 208 of tie bolt 210. Retention element 216 may comprise, for example, a metal safety wire. Retention element 216 may also comprise, for example, a pin such as a cotter pin. Although described with reference to specific types of retention elements, any retention element capable of engaging with retention hole 214 and preventing tie nut 212 from disengaging with threaded end 208 of tie bolt 210 is within the scope of the present disclosure.

Wheel assembly 100 may comprise multiple tie bolt systems 106. For example, as illustrated in FIG. 1B, multiple tie bolt systems 106 may be arranged circumferentially along first wheel section 104 and second wheel section 102. In such embodiments, one or more of the tie bolt systems 106 may comprise the systems illustrated in FIGS. 2A-2C. A single retention element 216, such as, for example, a safety wire, may engage with retention holes of multiple tie bolts 210. In further embodiments, an individual and/or discrete retention element 216 may engage with a retention hole 214 of each individual tie bolt 210.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel assembly, comprising:
a first wheel section having a first outer surface, a first mate face, and a plurality of first bolt holes;
a second wheel section having a second outer surface, a second mate face, and a plurality of second bolt holes, wherein the second mate face is configured to contact and engage with the first mate face, and wherein the plurality of second bolt holes are configured to align with the plurality of first bolt holes;
a plurality of tie bolts each having a threaded end and a length sufficient to pass through a respective one of the plurality of first bolt holes and the plurality of second bolt holes, wherein the threaded end comprises a first retention hole and a second retention hole spaced apart from each other, wherein the first retention hole and the second retention hole each extend completely through the threaded end, wherein at least one of the first retention hole and the second retention hole of each tie bolt of the plurality of tie bolts is offset relative to a central longitudinal axis of the tie bolt;
a plurality of nuts each configured to engage with the threaded end of a respective one of the plurality of tie bolts; and
a single nut retention element extending through one of the first retention hole and the second retention hole of each tie bolt of the plurality of tie bolts.

2. The wheel assembly of claim 1, wherein each tie bolt of the plurality of tie bolts passes from the first outer surface through a respective one of the plurality of first bolt holes of the first wheel section and through a respective one of the plurality of second bolt holes to protrude from the second outer surface of the second wheel section.

3. The wheel assembly of claim 2, further comprising a first washer positioned between a head of the tie bolt and the first outer surface.

4. The wheel assembly of claim 3, further comprising a second washer positioned between the second outer surface and the nut.

5. A tie bolt assembly, comprising:
- a plurality of tie bolts, each tie bolt of the plurality of tie bolts having a threaded end and a length sufficient to pass through a first bolt hole and a second bolt hole, wherein the threaded end of the tie bolt comprises a first retention hole and a second retention hole spaced apart from each other, wherein the first retention hole and the second retention hole each extend completely through the threaded end and wherein at least one of the first retention hole or the second retention hole of each tie bolt of the plurality of tie bolts is offset relative to a central longitudinal axis of the tie bolt;
- a plurality of nuts, each nut of the plurality of nuts configured to engage with the threaded end of a respective tie bolt of the plurality of tie bolts; and
- a single nut retention element extending through one of the first retention hole and the second retention hole of a respective tie bolt of the plurality of tie bolts.

6. The tie bolt assembly of claim 5, wherein the first retention hole and the second retention hole are offset relative to the central longitudinal axis of the tie bolt.

7. The tie bolt assembly of claim 5, wherein each tie bolt of the plurality of tie bolts comprises a third retention hole.

\* \* \* \* \*